United States Patent
Ogura et al.

(10) Patent No.: US 6,671,650 B2
(45) Date of Patent: Dec. 30, 2003

(54) POSITION MEASURING APPARATUS AND WORKING APPARATUS USING THE SAME

(75) Inventors: Katsuyuki Ogura, Utsunomiya (JP); Masakazu Matsumoto, Utsunomiya (JP); Kozo Sugita, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 41 days.

(21) Appl. No.: 10/076,654

(22) Filed: Feb. 19, 2002

(65) Prior Publication Data

US 2002/0123858 A1 Sep. 5, 2002

(30) Foreign Application Priority Data

Mar. 5, 2001  (JP) ........................................ 2001-060811

(51) Int. Cl.[7] .............................................. G01C 17/00
(52) U.S. Cl. ......................................... 702/152; 701/26
(58) Field of Search ........................... 702/152, 33, 99, 702/95, 105, 167, 150–153, 157–159, 168, FOR 144, FOR 146–147, FOR 156, FOR 170; 701/26; 364/559; 33/702, 502, 503; 73/1.79, 1.81

(56) References Cited

U.S. PATENT DOCUMENTS

| | | |
|---|---|---|
| 4,276,698 A | 7/1981 | Dore et al. |
| 5,408,758 A | 4/1995 | Mizutani et al. |
| 5,579,246 A | 11/1996 | Ebersbach et al. |
| 6,041,274 A | * 3/2000 | Onishi et al. ............... 701/26 |

FOREIGN PATENT DOCUMENTS

| | | |
|---|---|---|
| DE | 44 21 302 C1 | 12/1995 |
| DE | 198 30 646 A 1 | 1/2000 |
| EP | 275 428 A2 | 7/1988 |
| EP | 657 715 A | 6/1995 |
| FR | 2 330 997 | 6/1977 |
| JP | 05-010751 | 1/1993 |
| JP | 10-009852 | 1/1998 |

* cited by examiner

*Primary Examiner*—John Barlow
*Assistant Examiner*—Xiuqin Sun
(74) *Attorney, Agent, or Firm*—Oliff & Berridge, PLC (57) ABSTRACT

An object of the invention is to provide a position measuring apparatus which can execute a stable accuracy assurance at a high accuracy against a deterioration with age and a temperature fluctuation of the apparatus while making a correction of an existing volumetric measuring accuracy effective. In order to achieve the object, in accordance with the present invention, in a position measuring apparatus which measures a target position within a specified coordinate space with respect to a predetermined reference surface (4) on the basis of a coordinate system so as to compensate errors, there is provided a detector (18) for measuring whether or not a change is occurred in a relation with respect to the reference surface (4), in a movement executed by a moving machine (8), and there is further provided with an error corrector (20) for correcting at least any one of a compensation parameter compensating a positional coordinates by an error compensator (16) and a positional coordinate compensated by the error compensator (16), on the basis of an amount of change of a relation measured by the detector (18), in the case that the change is occurred.

14 Claims, 5 Drawing Sheets

POSITION MEASURING APPARATUS AND WORKING APPARATUS USING THE SAME

The present application claims a priority of Japanese Patent Application No. 2001-60811 filed on Mar. 5, 2001 and is inserted herein.

FIELD OF THE INVENTION

The present invention relates to an improvement of a compensation mechanism for compensating an error of a measured coordinate position, in a moving machine having a coordinate space mechanism such as a Coordinate Measuring Machine, a machine tool, a robot and the like.

DESCRIPTION OF THE PRIOR ART

A position measuring apparatus which can execute a position measurement within a three-dimensional space has been used for executing an accurate operation, in various moving machines such as the Coordinate Measuring Machine, the machine tool, the robot and the like.

As the position measuring apparatus mentioned above, a description will be given by exemplifying the Coordinate Measuring Machine. In the Coordinate Measuring Machine, it is possible to determine a distance from a first target position to a second target position in a subject to be measured by measuring coordinates of the first target position and the second target position. If the manner mentioned above is continuously used, it is possible to accurately comprehend a two-dimensional or three-dimensional shape of the measured subject.

However, at a time of determining a coordinate of a target position, there is a case that a distortion is generated in a mechanical shape of the Coordinate Measuring Machine, for example, by moving a detector such as a contact-type probe or the like for detecting the target position. Accordingly, there has been a case that an error is occurred in indexing an accurate position coordinate. Therefore, in the conventional art, in order to prevent the distortion in the mechanical shape mentioned above, a countermeasure of increasing a static rigidity or the like has been employed.

Further, in order to measure an error included in the measured value, minimize a geometrical error and make it possible to correspond to a high accuracy, there has existed an apparatus which mounts a software for computing the geometrical error on the basis of the geometrical error measured by a reference device or the like and giving a compensation to the measured positional coordinate.

Figure 5:
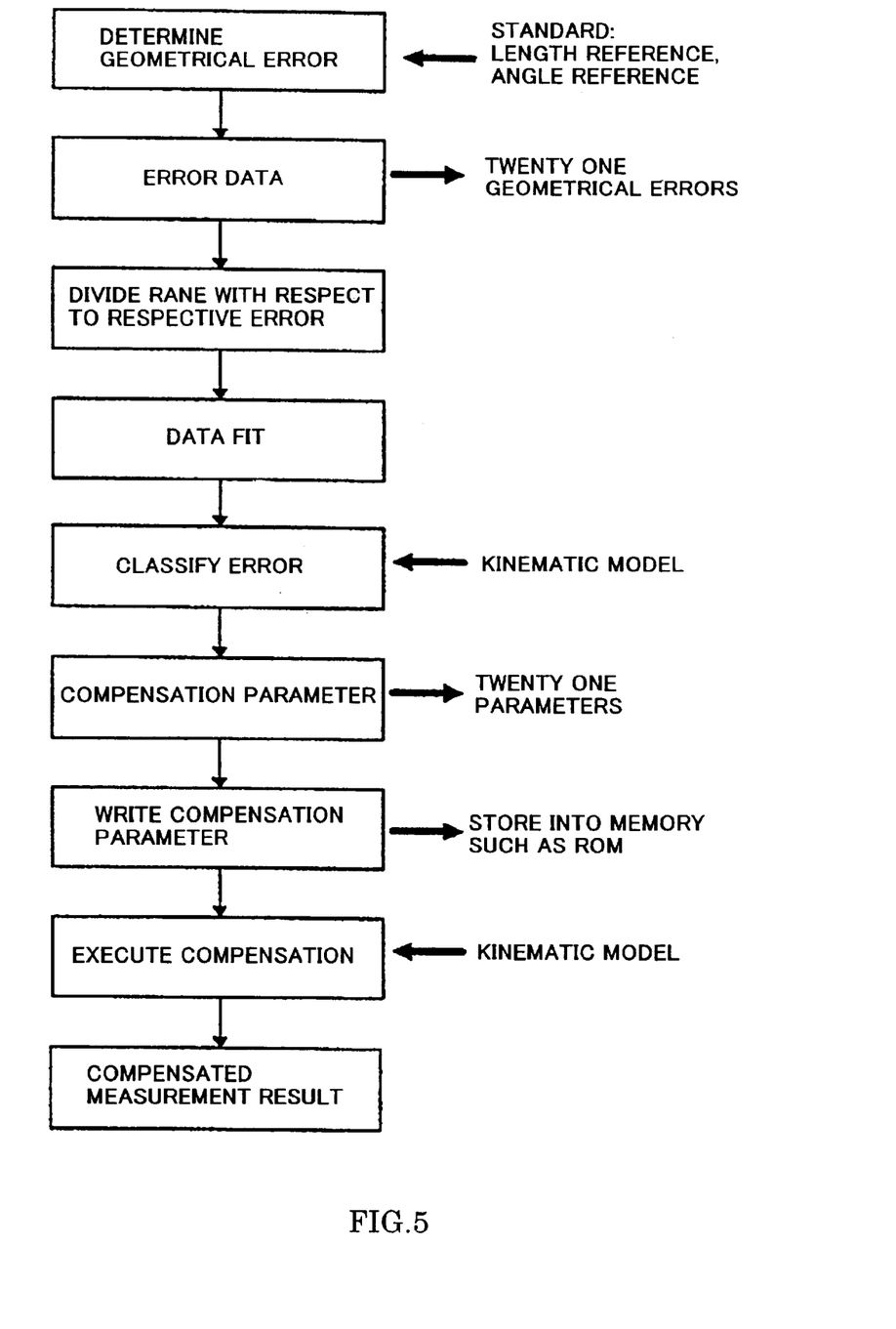
FIG. 5 is a block diagram showing a basic motion order of a software for adding a compensation to a positional coordinate.

A key point in volumetric measuring accuracy correction of the Coordinate Measuring Machine is the geometrical error. Accordingly, a basic operation order of the software is shown by a block diagram in FIG. 5. As shown in FIG. 5, the software of this kind at first mounts a length reference device such as a gauge block or a step gauge, or an angle reference device such as a right angle reference device on a table of the Coordinate Measuring Machine. Then, a measurement is executed by setting these reference devices as a workpiece. Next, the geometrical error data are determined on the basis of these measured values, a command value of a position at a time of executing the measurement, the error of the reference devices themselves and the like. Then, ranges with appropriate length are determined by analyzing the error data. In each of the ranges, the errors are approximated in accordance with a function (data fit), thereafter, the errors are classified into respective error kinds at every axis in accordance with a kinematic model of the measuring apparatus, and a compensation parameter with respect to the measured coordinate is prepared. The parameter is stored and the compensation with respect to the measured coordinate is executed.

Since an influence of a reason such as the angle error or the like is generally included in the geometrical error measured in the Coordinate Measuring Machine, it is necessary to execute an isolation process of the error, in order to treat as the errors on the respective axis. In this case, the kinematic model is used for the isolation process of the errors. The geometrical errors isolated by using the kinematic model has three scale errors in a rectangular coordinates system each one being with respect to the respective axis, three errors in a straightness within a vertical plane each one being with respect to the respective axis, three errors in a straightness within a horizontal plane each one being with respect to the respective axis, three pitching errors each one being with respect to the respective axis, three yaw errors each one being with respect to the respective axis, three rolling errors each one being with respect to the respective axis, and three perpendicular errors between the respective axis (xy axis, yz axis and zx axis), and totally has twenty one errors. This kinematic model is used for isolation the errors at a time of computing the compensation parameter and at the same time, is used at a time of converting the respective compensation parameter into the errors on the coordinate space at a time of executing the compensation.

Even when the errors in the respective axis exist by using the process mentioned above, the geometrical error compensating capacity of the Coordinate Measuring Machine is improved by measuring and compensating the errors. Accordingly, it has been possible to achieve a high accuracy of the Coordinate Measuring Machine.

As mentioned above, in order to measure the accurate positional coordinate, it is important that a relation between the moving machine and the reference surface corresponding to the reference of the positional coordinate is kept constant. Among them, a guide for the moving machine provided on the reference surface has a particularly important role. Even when the high accuracy of the Coordinate Measuring Machine is realized by utilizing the space accuracy compensation in accordance with the software, a deterioration of accuracy in the Coordinate Measuring Machine is directly caused if the guide for the moving machine provided on the reference surface is changed due to a deterioration with age or a temperature fluctuation. Therefore, in the conventional art, in the same manner as mentioned above, a countermeasure is given by increasing the static rigidity and controlling the ambient temperature.

However, in recent years, there has appeared a large Coordinate Measuring Machine. With respect to the large apparatus mentioned above, as well as it is very hard to place a temperature-controlled chamber, the large apparatus directly uses a base as a reference surface in most cases. Accordingly, even when a building in which the temperature is controlled is completely provided, the base is changed largely between summer and winter. In accordance with the current space accuracy compensation, it has not been possible to secure a sufficient accuracy.

Further, even in the compact apparatus, since the deterioration with age of the base corresponding to the reference surface is generated even if it is a very little, it can not be ignored for the purpose of aiming a further high accuracy.

SUMMARY OF THE INVENTION

The present invention is made in consideration of the problems mentioned above, and a first object of the present invention is to provide a position measuring apparatus which can execute a stable accuracy assurance at a high accuracy against a deterioration with age and a temperature fluctuation of the apparatus while making a correction of an existing volumetric measuring accuracy effective. Further, a second object of the present invention is to provide apparatus which can execute a further accuracy stability and improve a reliability while keeping a general-purpose property even in a Coordinate Measuring Machine.

In order to achieve the object mentioned above, in accordance with the present invention, there is provided a position measuring apparatus comprising:

a position coordinate measuring mechanism constituted by a target position detector, a moving machine and a positional coordinate computer;

a memory classifying geometrical errors on the basis of a positional coordinate measured by the position coordinate measuring mechanism and storing compensation parameters determined from the respective classified errors;

an error compensator for reading out the compensation parameters so as to compensate the errors; and the target position within a specified coordinate space being measured on the basis of a coordinate system, wherein the position measuring apparatus comprises:

a detector for measuring whether or not a change is occurred in a relation with respect to a reference surface, in a movement executed by the moving machine; and an error corrector for correcting any one of the compensation parameter compensating the positional coordinates at least by the error compensator and the positional coordinate compensated by the error compensator in order to remove an influence given to the positional coordinate computed by the positional coordinate computer in correspondence to the relation between the movement executed by the moving machine and the reference surface, on the basis of an amount of change of the relation measured by the detector, in the case that the change is occurred.

In this case, the target position detector detects the target position in the coordinate space with respect to a predetermined reference surface.

Further, the moving machine moves in accordance with a predetermined relation with respect to the reference surface for the purpose of detecting the target position by the target position detector so as to move the target position detector.

The positional coordinate computer computes the target position from the data such as the displacement of the moving machine.

Further, in the position measuring apparatus in accordance with the present invention, it is preferable that the coordinate system is an xyz rectangular coordinates system in which the coordinate system is extended in vertical, horizontal and height directions.

Further, in the position measuring apparatus in accordance with the present invention, it is preferable that the moving machine comprises:

a horizontal direction moving machine for moving in conformity with or in parallel to an x axis;

a vertical direction moving machine for moving in conformity with or in parallel to a y axis; and a height direction moving machine for moving in conformity with or in parallel to a z axis, and the detector is provided in any one of the vertical direction moving machine, the horizontal direction moving machine and the height direction moving machine.

Further, in the position measuring apparatus in accordance with the present invention, it is preferable that the detector is constituted by a reference side angle meter and a measurement side angle meter.

Further, in the position measuring apparatus in accordance with the present invention, it is preferable that the moving machine comprises:

a vertical direction moving machine constituted by a straight guide provided on the reference surface and vertical direction moving mechanism capable of moving along the guide;

a horizontal direction moving machine constituted by a straight guide mounted to a top of the vertical direction moving machine and provided in a direction parallel to the reference surface and orthogonal to the movement direction of the vertical direction moving machine, and a horizontal direction moving mechanism moving along the guide; and a height direction moving machine constituted by a rod-liked member mounted to the horizontal direction moving machine and provided with the target position detector at a tip, and a height direction moving mechanism moving the rod-liked member in a direction orthogonal to the reference surface;

the vertical direction moving machine moves the target position detector on a specified straight line on the reference surface, the horizontal direction moving machine moves within a surface orthogonal to the movement direction of the vertical direction moving machine and in parallel to the reference surface, the height direction moving machine has a predetermined relation with respect to the reference surface by moving in a direction orthogonal to the reference surface, and the detector is constituted by a reference side angle meter provided on a guide of the vertical direction moving machine and a measurement side angle meter provided in the vertical direction moving mechanism.

Further, in the position measuring apparatus in accordance with the present invention, it is preferable that the angle meter is a biaxial angle level.

Further, in the position measuring apparatus in accordance with the present invention, it is preferable that the angle meter is a laser angle level.

Further, in the position measuring apparatus in accordance with the present invention, it is preferable that the coordinate system is a biaxial rectangular coordinates system.

Further, in the position measuring apparatus in accordance with the present invention, it is preferable that an amount of change of the relation measured by the detector includes a pitching error and a yaw error with respect to an axis in a specified linear direction.

Further, in the position measuring apparatus in accordance with the present invention, it is preferable that a memory for saving an amount of change of the relation measured by the detector is further provided, and the detector is detachably provided.

Further, in order to achieve the object mentioned above, a working apparatus in accordance with the present invention has a feature that the position measuring apparatus in accordance with the present invention is provided.

DETAILED DESCRIPTION OF THE PREFERRED EMBODIMENT

A description will be in detail given below of the present invention by using an embodiment in accordance with the present invention.

Figure 1:
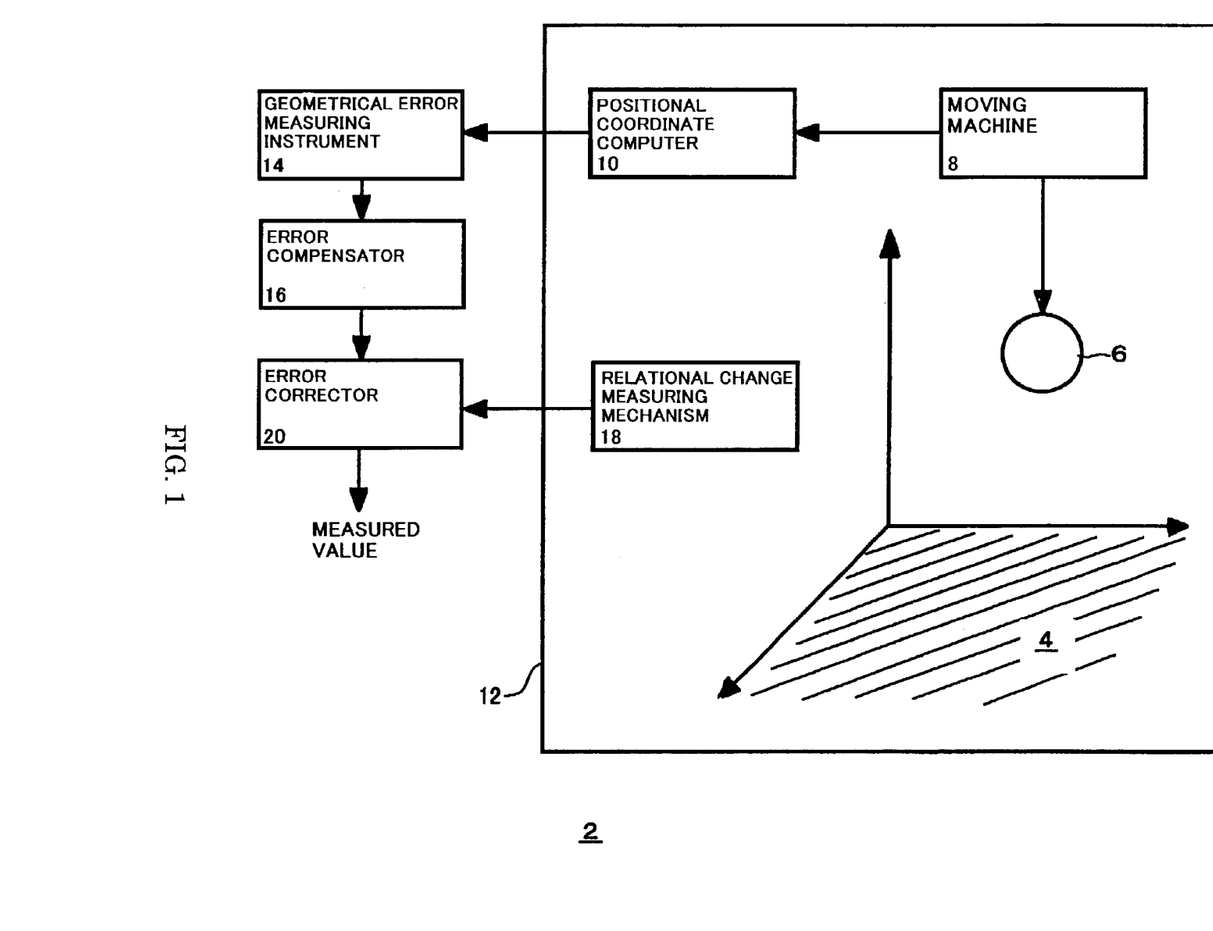
FIG. 1 is a block diagram of a structure summary of an embodiment of a position measuring apparatus in accordance with the present invention.

FIG. 1 shows a block diagram of a structure summary of an embodiment of a position measuring apparatus in accordance with the present invention.

A position measuring apparatus 2 in accordance with the present invention shown in FIG. 1 is provided with a positional coordinate measuring mechanism 12 constituted by a target position detector 6, a moving machine 8 and a positional coordinate computer 10. Further, it has a geometrical error measuring instrument 14 and an error compensator 16. Further, it measures a target position within a specified three-dimensional space on the basis of a three-axis coordinate system.

In this case, the target position detector 6 detects a target position in a coordinate space with respect to a predetermined reference surface 4.

Further, the moving machine 8 moves in accordance with a predetermined relation with respect to the reference surface 4 in order to detect the target position by the target position detector 6, thereby moving the target position detector 6.

The positional coordinate computer 10 computes a positional coordinate of the target position on the basis of the data such as the displacement (amount of displacement) of the moving machine 8.

The geometrical error measuring instrument 14 measures and computes the geometrical error on the basis of the positional coordinate measured by the positional coordinate measuring mechanism 12. The error is classified and a compensation parameter is computed with respect to each of the classified errors.

The error compensator 16 compensates the error by using the compensation parameter computed by the geometrical error measuring instrument 14.

Further, a characteristic matter in the position measuring apparatus in accordance with the present invention is a matter that there are provided a relational change measuring mechanism (detector) 18 detachably provided with respect to the positional coordinate measuring mechanism 12, and an error corrector 20.

In this case, the relational change measuring mechanism 18 measures whether or not a change is occurred in a relation to the reference surface 4, in the motion which the moving machine 8 executes.

Further, the error corrector 20 further corrects the positional coordinate compensated by the error compensator 16 in order to remove the influence given to the positional coordinate computed by the positional coordinate computer 10 due to the change of the relation with respect to the reference surface 4 and the motion executed by the moving machine 8, on the basis of the displacement of the relation measured by the relational change measuring mechanism 18, in the case that any change is occurred.

Accordingly, even when the error is occurred in the measurement due to the deterioration with age and the temperature fluctuation, it is possible to correct the error by the error corrector 20. Therefore, it is possible to achieve a first object of the present invention that it is possible to execute an accurate volumetric measuring accuracy correction.

In this case, the correction parameter is stored by a memory (not shown), is read out by the error compensator 16, and is used for compensating the error.

Figure 2:
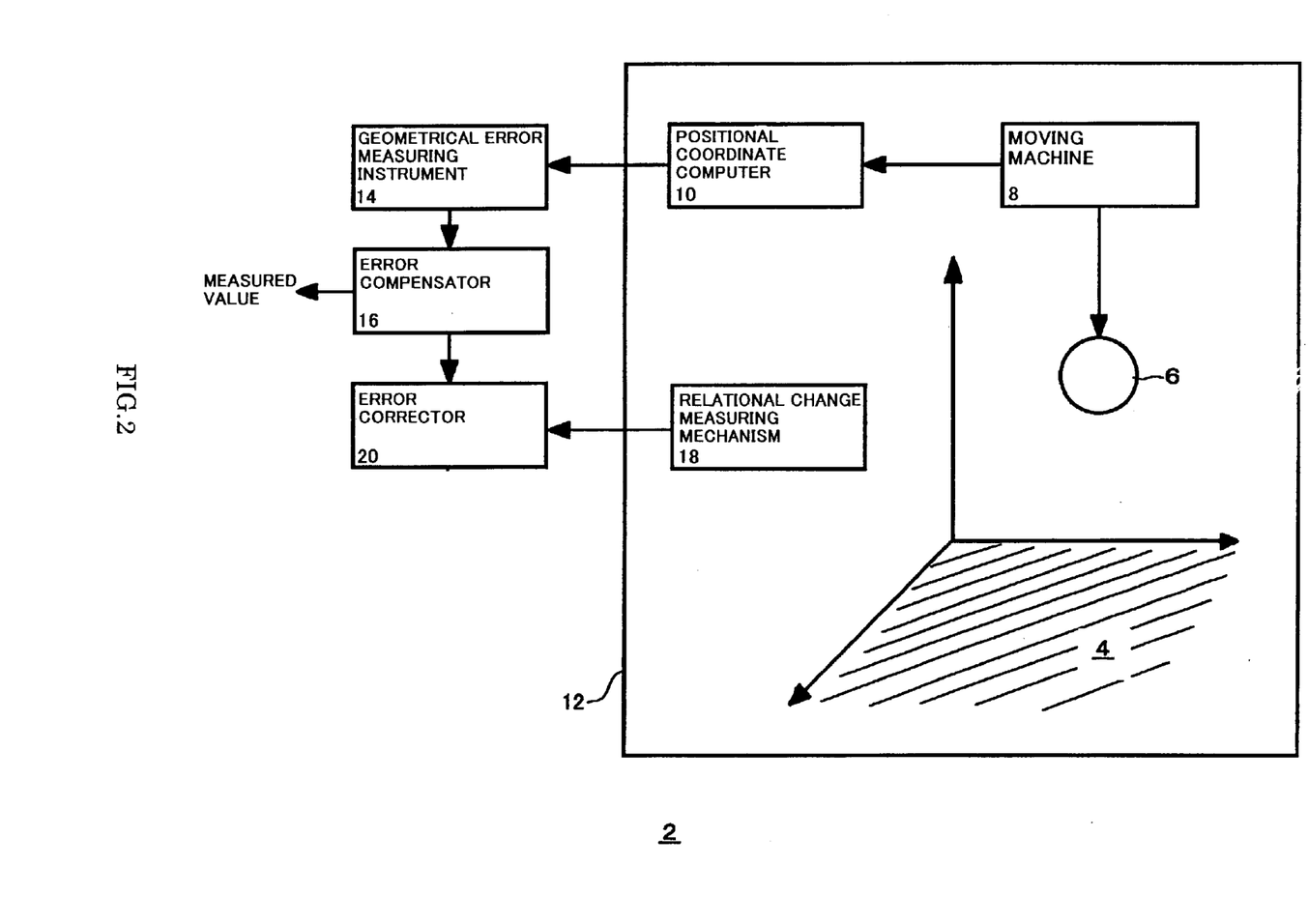
FIG. 2 is a block diagram of a structure summary of a second embodiment in accordance with the present invention.

Further, the error compensation data computed by the error corrector 20 is stored by a memory (not shown), is read out by the error corrector 20 and is used for executing an accurate volumetric measuring accuracy correction by further applying an error correction to the positional coordinate compensated the Further, FIG. 2 shows a block diagram of a structure summary of a second embodiment in accordance with the present invention. In this case, in FIG. 2, the same reference numerals are attached to the same components as those in FIG. 1, and a description thereof will be omitted.

The position measuring apparatus 2 shown in FIG. 2 is structured such that when a specified positional coordinate is computed by the positional coordinate measuring mechanism 12, the compensation parameter computed by the geometrical error measuring instrument 14 in the positional coordinate is read out. At a time of compensating the positional coordinate by the error compensator 16 from the information, the compensation parameter compensating the positional coordinate of the error compensator 16 is corrected by the error corrector 20. The apparatus is structured such that an accurate positional coordinate is computed. Even in the embodiment mentioned above, the same effects can be obtained.

Figure 3:
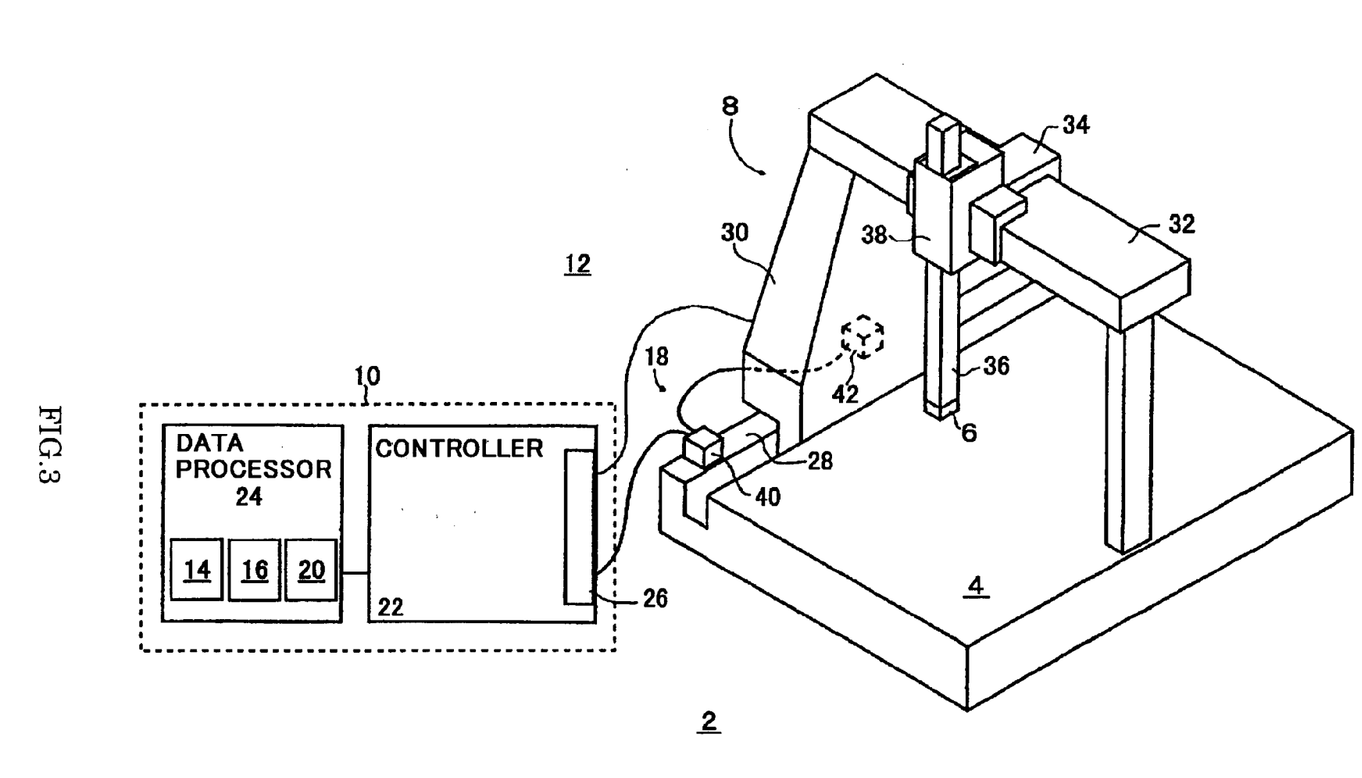
FIG. 3 is a schematic view of a structure of the position measuring apparatus corresponding to an embodiment in accordance with the present invention.

FIG. 3 is a schematic view of a structure of a position measuring apparatus corresponding to an embodiment in accordance with the present invention. In FIG. 3, the same reference numerals are attached to the same components as those in FIG. 1, and a description will be omitted.

As shown in FIG. 3, a position measuring apparatus corresponding to one embodiment in accordance with the present invention is provided with a base 4 corresponding to the reference surface. Further, it is provided with a controller 22 and a data processor 24.

The controller 22 controls the apparatus such as the moving machine 8 and the like.

The data processor 24 executes various data processes such as the position measured data and an analysis thereof.

In accordance with the present invention, the positional coordinate computer 10 is constituted by the controller 22 and the data processor 24. The data such as displacement of the target position detector 6 moved by the moving machine 8 is received by the controller 22 through an interface 26 provided in the controller 22. The data received by the controller 22 is transmitted to the data processor 24 and is analyzed. Further, the positional coordinate is computed by the data processor 24.

Further, in the present embodiment, the geometrical error measuring instrument 14 measures the data such as a motion property of the position measuring apparatus 2 previously measured by a measurement standard or the like, and a deformation together with the motion. The data is stored in a correction parameter memory such as a hard disc provided in the data processor 24, as the compensation parameter.

Further, the error compensator 16 is a software for applying a volumetric measuring accuracy correction to the positional coordinate measured by the positional coordinate measuring mechanism 12 by using the geometrical error information of the geometrical error measuring instrument 14. This software is stored in the hard disc of the data processor or the like in the same manner as the geometrical error measuring instrument 14. This software is automatically executed on the basis of a user's desire or an operating program of the apparatus.

Further, the error corrector 20 is a software for further correcting the error included in the positional coordinate compensated by the error compensator 16 due to a reason that the relation between the motion of the moving machine 8 and the reference surface (the base 4) is changed, on the basis of the measurement result of the relational change measuring mechanism 18. Further, the error corrector 20 and the error correction data computed by the error corrector 20 are stored in the hard disc of the data processor or the like in the same manner as that of the geometrical error measuring instrument 14 and the error compensator 16.

When the specified positional coordinate is calculated by the positional coordinate measuring mechanism 12 in accordance with the manner mentioned above, the geometrical error property in the positional coordinate is read out from the memory. The positional coordinate compensated the error by the error compensator 16 is calculated from the read-out information. Then, the error due to the influence of the deterioration with age of the apparatus, the deformation caused by the temperature fluctuation and the like is further corrected by the error corrector 20. Accordingly, since it is possible to remove the error occurred due to the deterioration with age, the temperature fluctuation and the like from the measured value, it is possible to secure an accurate volumetric measuring accuracy correction.

Further, in accordance with the second embodiment, when the specified positional coordinate is computed by the positional coordinate measuring mechanism 12, the geometric error property in the positional coordinate is read out from the memory. In order to achieve the correction with taking into consideration the error due to the influence of the deterioration with age of the apparatus, the deformation caused by the temperature fluctuation and the like, the compensation parameter compensated the error by the error compensator 16 is corrected by the error corrector 20.

Accordingly, it is possible to remove the error occurred due to the deterioration with age, the temperature fluctuation and the like from the measured value, together with the geometrical error from the positional coordinate computed by the error compensator 16. Therefore, it is also possible to secure an accurate volumetric measuring accuracy correction.

In this case, in the present invention, it is preferable that the three-axis coordinate system set with respect to the reference surface is an xyz rectangular coordinates system extended in vertical, horizontal and height directions. In the case that the three-axis rectangular coordinates system mentioned above is employed, it is easy to comprehend the positional relation of the measured positional coordinate, and a calculation formula with respect to the positional coordinate calculation and the like can be made simpler. Accordingly, it is possible to reduce a load for calculation process of the apparatus.

Further, in the present invention, it is preferable that the moving machine is constituted by a horizontal direction moving machine for moving in conformity with or in parallel to an x axis, a vertical direction moving machine for moving in conformity with or in parallel to a y axis, and a height direction moving machine for moving in conformity with or in parallel to a z axis. As mentioned above, when the movement directions of the moving machine are in conformity with or in parallel to the respective axis, it is possible to make a calculation process in the position measurement simpler. Accordingly, it is possible to widely reduce a load in the calculation process of the apparatus.

In this case, in one embodiment of the present invention described in FIG. 3, the moving machine 8 is constituted by the vertical direction moving machine, the horizontal direction moving machine and the height direction moving machine.

The vertical direction moving machine is constituted by a straight guide 28 provided on the base 4 corresponding to the reference surface, and a vertical direction moving mechanism 30 capable of moving along the guide 28.

The horizontal direction moving machine is constituted by a straight guide 32 mounted in a top of the vertical direction moving machine and provided in parallel to the reference surface and in a direction orthogonal to a moving direction of the vertical direction moving machine, and a horizontal direction moving mechanism 34 moving along the guide 32.

The height direction moving machine is constituted by a rod-liked member 36 mounted to the horizontal direction moving machine and provided with the target position detector 6 at a tip, and a height direction moving mechanism 38 driving the rod-liked member 36 in a direction orthogonal to the base 4 corresponding to the reference surface.

Accordingly, the vertical direction moving machine can move the target position detector 6 on a specified straight line with respect to the reference surface 4. The horizontal direction moving machine can move within a surface orthogonal to the movement direction of said vertical direction moving machine and in parallel to the reference surface 4. The height direction moving machine can be moved in a direction orthogonal to the reference surface 4.

As a result, it is possible to move the target position detector 6 to an optional place within a specified three-dimensional space defined by a movable range of the vertical direction moving machine, a movable range of the horizontal direction moving machine and a movable range of the height direction moving machine.

Further, it is possible to clearly classify what relation the respective moving machine in the vertical, horizontal and height directions move the target position detector 6 with respect to the reference surface 4. This makes it easy to analyze the position calculation and the error correction. As a result, it is possible to widely reduce the load in the calculation process of the apparatus and it is possible to make a control with respect to the motion of the moving machine 8 easy.

Further, in the present embodiment, the relational change measuring mechanism 18 is constituted by a reference side angle meter 40 provided on the guide 28 of the vertical direction moving machine, and a measurement side angle meter 42 provided in the vertical direction moving mechanism 30.

In the present invention, in the case of having the moving machine as mentioned above, it is preferable that the relational change measuring mechanism 18 is provided in a guide and a moving mechanism of the moving machine provided on the reference surface. The guide and the moving mechanism provided on the reference surface as mentioned above directly have a relation to the relation between the motion executed by the moving machine and the reference surface. Accordingly, a change of the relation between the guide and the moving mechanism provided on the reference surface has an important meaning with respect to the error, and it is possible to measure a whole change of the motion of the moving machine and the reference surface by measuring the change of the relation.

In accordance with the present invention, as the relational change measuring mechanism, it is enough to employ a detector capable of measuring a pitching error and a yaw error with respect to the axis in a specified rectilinear coinciding with the movement direction, so that various detectors can be employed. However, it is particularly preferable that the relational change measuring mechanism is constituted by a reference side angle meter and a measurement side angle meter which can know the change of the motional relation mentioned above.

Further, among the angle meters mentioned above, if a biaxial angle level or a laser angle level is employed, it is possible to particularly preferably measure the change of the relation.

In one embodiment described in FIG. 3, the biaxial angle level is used as the relational change measuring mechanism. The biaxial angle level is connected to the interface 26 provided in the controller 22. The measured values of the reference side biaxial angle level 40 and the measurement side biaxial angle level 42 are received by the controller 22 through the interface 26. The measured data is transmitted to the data processor 24, and the correction executed by the error corrector 20 is determined on the basis of the measured amount of change.

A flow of an automatic volumetric measuring accuracy correction in accordance with the first embodiment of the present invention having the structure mentioned above is as follows.

At first, the position measurement of the workpiece or the like corresponding to the subject to be measured mounted on the base 4 is executed by the user or the like. Further, when the positional coordinate is obtained, the error is read out from the memory by executing the automatic volumetric measuring accuracy correction program and the compensation is executed by the error compensator 16.

Further, the vertical direction moving mechanism 30 is automatically moved at one turn in a y axis moving range, and the measurement is executed by the reference side biaxial angle level 40 and the measurement side biaxial angle level 42 at that time. A y axis pitching raw data and a y axis yaw raw data are picked up by taking a difference therebetween. In accordance with the present embodiment, since the biaxial angle level is used, two axis can be simultaneously measured.

The angle errors in the respective portions among the current y axis moving range is computed from the measured y axis pitching raw data and y axis yaw raw data, whereby the existing angle error is corrected. Further, the positional coordinate compensated the error by the error compensator 16 is again corrected in the volumetric measuring accuracy by the error corrector 20.

Further, in the same components as that of the apparatus mentioned above, a flow of the automatic volumetric measuring accuracy correction in the case of the second embodiment in accordance with the present invention is as follows.

At first, the position measurement of the workpiece or the like corresponding to the subject to be measured mounted on the base 4 is executed by the user or the like. Further, the compensation parameter is read out from the memory, thereby preparing the compensation executed by the error compensator 16.

Further, the vertical direction moving mechanism 30 is automatically moved at one turn in a y axis moving range, and the measurement is executed by the reference side biaxial angle level 40 and the measurement side biaxial angle level 42 at that time. A y axis pitching raw data and a y axis yaw raw data are picked up by taking a difference therebetween. The angle errors in the respective portions among the current y axis moving range is computed from the measured y axis pitching raw data and y axis yaw raw data, whereby the existing angle error is corrected. Further, how the compensation parameter for compensating the positional coordinate by the error compensator 16 should be corrected is computed. In accordance with the result, the error corrector 20 adds a correction to the compensation parameter of the compensation executed by the error compensator 16, and the error compensator 16 executes the volumetric measuring accuracy correction.

As mentioned above, in accordance with the present invention, a new error information can be always determined in either embodiments, and a stable accuracy can be secured.

Further, in recent years, there has appeared a large position measuring apparatus of this kind. In the case of the large apparatus mentioned above, the base is used as the reference surface in most cases.

Figure 4:
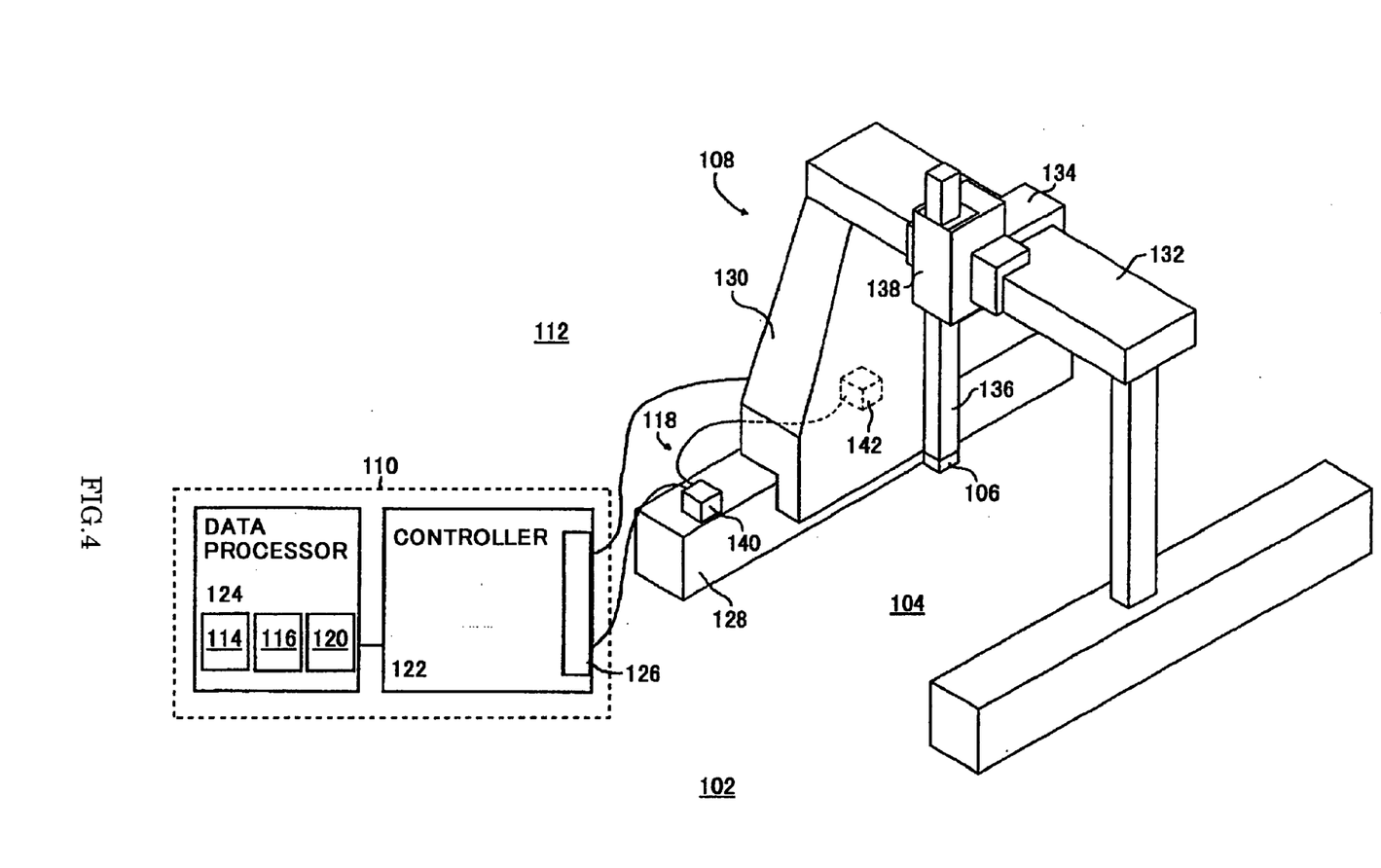
FIG. 4 is a schematic view of a structure of an embodiment of a large position measuring apparatus in accordance with the present invention.

FIG. 4 shows a schematic view of a structure of one embodiment of the large position measuring apparatus mentioned above.

In this case, in FIG. 4, reference numerals obtained by a hundred to the reference numerals of the components in FIG. 3 are attached to corresponding components to those in FIG. 3, and a description thereof will be omitted.

As shown in FIG. 4, in accordance with the present embodiment, a foundation (base) 104 is directly used as the reference surface. A vertical direction moving machine of a moving machine 108 is constituted by a guide 128 directly provided on the foundation 104 and a vertical direction moving mechanism 130.

As mentioned above, in accordance with the present embodiment, since the guide 128 is directly fixed onto the foundation 104, a change of the foundation 104 directly gives an influence to the guide 128. Accordingly, a geometrical accuracy of a whole of the moving machine is changed.

However, even if the geometric accuracy of the moving machine is changed due to the change of the foundation 104, in accordance with the position measuring apparatus of the present invention, the change is measured by a relational change measuring mechanism 118, and an influence of the error is removed by the error corrector 120. Accordingly, it is possible to achieve the second object of the present invention, that is, the accuracy is not reduced due to the change of the base.

In accordance with the position measuring apparatus corresponding to one embodiment of the present invention described above, an automatic volumetric measuring accuracy correction apparatus can be easily constructed by using one set of the reference side and measurement side angle meters, the interface 126, the controller 122 and the data processor 124.

Further, in the embodiment in accordance with the present invention, the description is given of the embodiment which automatically moves the vertical direction moving mechanism 130 in the y axis moving range at one turn every time of measuring the workpiece. In addition, the y axis pitching raw data and the y axis yaw raw data can be collected by automatically moving the vertical direction moving mechanism 130 in the y axis moving range at fixed intervals or optional timings such as every day, every one month and every half year. The angle errors in the respective portions in the y axis moving range are calculated on the basis of the data, thereby correcting the compensation parameter compensating the positional coordinate by the error corrector 120. It is possible to employ a periodical calibration in which the compensation parameter is stored in the memory such as the hard disc provided in the data processor 124, by the error compensator 116. In accordance with the components mentioned above, since a volumetric measuring accuracy correction can be executed by using the compensation parameter which has already corrected in accordance with the nearest periodical calibration, it is possible to reduce a labor hour of moving the y axis at every workpiece measurements so as to calibrate.

Further, in accordance with the embodiment of the present invention, the structure is made such that the geometrical error measuring instrument 114 is provided. However, it is not necessary that this is always provided, and a simple structure in which the geometrical error measuring instrument 114 is not provided can be employed. That is, the structure may be made such that the geometrical error measuring apparatus is provided in the external portion, the compensation parameter is computed on the basis of the positional coordinate from the positional coordinate computer, and the compensation parameter is stored in the memory in the position measuring apparatus. In accordance with the structure mentioned above, the error compensator 116 can execute the volumetric measuring accuracy correction with respect to the positional coordinate by the positional coordinate corresponding to the output of the positional coordinate computer 110, and the compensation parameter read out from the memory. In this case, the error corrector 120 can also correct the compensation parameter on the basis of the error correcting data stored in the memory, or further correct the positional coordinate compensated the space accuracy by the compensation parameter so as to execute an accurate volumetric measuring accuracy correction. Since the geometrical error measuring apparatus provided in the external portion is not required for the present position measuring apparatus after the compensation parameter is stored in the memory in the position measuring apparatus, it can be taken out. Accordingly, there is an advantage that the structure can be made simpler.

Further, in the case of a base type Coordinate Measuring Machine or the like, a stable accuracy at a time of delivery can be maintained by the automatic volumetric measuring accuracy correction apparatus even in the case that the base is deformed due to the deterioration with age or the temperature fluctuation.

Further, in the case of the base type Coordinate Measuring Machine or the like, the stable accuracy can be maintained by the automatic space accuracy compensating apparatus even in the case that the base on which the Coordinate Measuring Machine or the like is placed is changed.

Further, the present invention can be also applied to an vision measuring machine which moves a image device such as a camera within an orthogonal plane so as to execute a two-dimensional measurement of the workpiece, and a working apparatus such as a machine tool. Accordingly, it is possible to always apply a volumetric measuring accuracy correction having a high accuracy.

As described above, in accordance with the position measuring apparatus of the present invention, it is possible to maintain a stable accuracy.

We claim:

1. A position measuring apparatus comprising:
    a target position detector for detecting a target position in a coordinate space with respect to a predetermined reference surface;
    a moving machine moving in accordance with a predetermined relation with respect to the reference surface so as to move said target position detector for the purpose of detecting the target position by said target position detector;
    a positional coordinate computer for computing a positional coordinate of the target position on the basis of a data such as a displacement of said moving machine;
    a position coordinate measuring mechanism constituted by said target position detector, said moving machine and said positional coordinate computer;
    a memory classifying geometrical errors on the basis of a positional coordinate measured by said position coordinate measuring mechanism and storing compensation parameters determined from the respective classified errors;
    an error compensator for reading out the compensation parameters so as to compensate the errors; and
    the target position within a specified coordinate space being measured on the basis of a coordinate system,
    wherein the position measuring apparatus comprises:
        a detector, comprising a reference side angle meter and a measurement side angle meter, for measuring whether or not a change is occurred in a relation with respect to said reference surface, in a movement executed by said moving machine; and
        an error corrector for correcting at least any one of the compensation parameter compensating the positional coordinates by said error compensator and the positional coordinate compensated by said error compensator in order to remove an influence given to the positional coordinate computed by the positional coordinate computer in correspondence to the relation between the movement executed by said moving machine and the reference surface, on the basis of an amount of change of the relation measured by said detector, in the case that the change is occurred.

2. A position measuring apparatus as claimed in claim 1, wherein said coordinate system is an xyz rectangular coordinates system in which said coordinate system is extended in vertical, horizontal and height directions.

3. A position measuring apparatus as claimed in claim 2, wherein said moving machine comprises:
    a horizontal direction moving machine for moving in conformity with or in parallel to an x axis;
    a vertical direction moving machine for moving in conformity with or in parallel to a y axis; and
    a height direction moving machine for moving in conformity with or in parallel to a z axis, and
    said detector is provided in any one of said vertical direction moving machine, said horizontal direction moving machine and said height direction moving machine.

4. A position measuring apparatus as claimed in claim 1, wherein said moving machine comprises:
    a vertical direction moving machine constituted by a straight guide provided on the reference surface and a vertical direction moving mechanism capable of moving along said guide;

a horizontal direction moving machine constituted by a straight guide mounted to a top of said vertical direction moving machine and provided in a direction parallel to the reference surface and orthogonal to the movement direction of the vertical direction moving machine, and a horizontal direction moving mechanism moving along said guide; and a height direction moving machine constituted by a rod-liked member mounted to said horizontal direction moving machine and provided with said target position detector at a tip, and a height direction moving mechanism moving said rod-liked member in a direction orthogonal to the reference surface, the vertical direction moving machine moves said target position detector on a specified straight line on the reference surface, the horizontal direction moving machine moves within a surface orthogonal to the movement direction of said vertical direction moving machine and in parallel to the reference surface, the height direction moving machine has a predetermined relation with respect to the reference surface by moving in a direction orthogonal to the reference surface, and said detector is constituted by a reference side angle meter provided on a guide of the vertical direction moving machine and a measurement side angle meter provided in the vertical direction moving mechanism.

5. A position measuring apparatus as claimed in claim 1, wherein said angle meter is a biaxial angle level.

6. A position measuring apparatus as claimed in claim 1, wherein said angle meter is a laser angle level.

7. A position measuring apparatus as claimed in claim 1, further comprising a memory for saving an amount of change of the relation measured by said detector, wherein said detector is detachably provided in the position measuring apparatus.

8. A working apparatus comprising the position measuring apparatus as claimed in claim 1.

9. A position measuring apparatus comprising:

a target position detector for detecting a target position in a coordinate space with respect to a predetermined reference surface;

a moving machine moving in accordance with a predetermined relation with respect to the reference surface so as to move said target position detector for the purpose of detecting the target position by said target position detector;

a positional coordinate computer for computing a positional coordinate of the target position on the basis of a data such as a displacement of said moving machine;

a position coordinate measuring mechanism constituted by said target position detector, said moving machine and said positional coordinate computer;

a memory classifying geometrical errors on the basis of a positional coordinate measured by said position coordinate measuring mechanism and storing compensation parameters determined from the respective classified errors;

an error compensator for reading out the compensation parameters so as to compensate the errors; and the target position within a specified coordinate space being measured on the basis of a biaxial rectangular coordinates system, wherein the position measuring apparatus comprises:

a detector for measuring whether or not a change is occurred in a relation with respect to said reference surface, in a movement executed by said moving machine; and an error corrector for correcting at least any one of the compensation parameter compensating the positional coordinates by said error compensator and the positional coordinate compensated by said error compensator in order to remove an influence given to the positional coordinate computed by the positional coordinate computer in correspondence to the relation between the movement executed by said moving machine and the reference surface, on the basis of an amount of change of the relation measured by said detector, in the case that the change is occurred.

10. A position measuring apparatus as claimed in claim 9, wherein an amount of change of the relation measured by said detector includes a pitching error and a yaw error with respect to an axis in a specified linear direction.

11. A position measuring apparatus as claimed in claim 9, wherein said angle meter is a biaxial angle level.

12. A position measuring apparatus as claimed in claim 9, wherein said angle meter is a laser angle level.

13. A position measuring apparatus as claimed in claim 9, further comprising a memory for saving an amount of change of the relation measured by said detector, wherein said detector is detachably provided in the position measuring apparatus.

14. A working apparatus comprising the position measuring apparatus as claimed in claim 9.

* * * * *